United States Patent [19]
Götz et al.

[11] Patent Number: 5,338,089
[45] Date of Patent: Aug. 16, 1994

[54] WINDSCREEN FOR A CONVERTIBLE AUTOMOBILE

[75] Inventors: Hans Götz, Böblingen; Karl-Heinz Baumann, Bondorf, both of Fed. Rep. of Germany

[73] Assignee: Daimler-Benz AG, Fed. Rep. of Germany

[21] Appl. No.: 29,638

[22] Filed: Mar. 11, 1993

Related U.S. Application Data

[63] Continuation of Ser. No. 270,692, Nov. 14, 1988, Pat. No. 5,219,201.

[30] Foreign Application Priority Data

Nov. 13, 1987 [DE] Fed. Rep. of Germany ....... 3738501
Oct. 26, 1988 [DE] Fed. Rep. of Germany ....... 3836375

[51] Int. Cl.⁵ .............................................. B60J 9/04
[52] U.S. Cl. ................................. 296/180.5; 296/85; 160/DIG. 2; 160/373
[58] Field of Search ............... 296/85, 180.1, 180.5; 160/DIG. 2, DIG. 7, 127, 373, 378

[56] References Cited

U.S. PATENT DOCUMENTS

| | | | |
|---|---|---|---|
| 2,514,082 | 7/1950 | Menrath | 296/85 |
| 3,002,784 | 10/1961 | Bagg | 296/85 |
| 3,085,621 | 4/1963 | Meranto | 160/DIG. 2 X |
| 4,285,383 | 8/1981 | Steenburgh | 160/374 |

FOREIGN PATENT DOCUMENTS

| | | | |
|---|---|---|---|
| 410838 | 3/1925 | Fed. Rep. of Germany. | |
| 543041 | 8/1922 | France | 296/85 |
| 7888 | of 1914 | United Kingdom | 296/85 |
| 235477 | 6/1925 | United Kingdom | 296/85 |
| 2103111 | 2/1983 | United Kingdom | 428/255 |

OTHER PUBLICATIONS

Breez-Bye Wind Rejector, Advertisement, Copy in Class 296, Subclass 85, Rec'd Apr. 8, 1948.

*Primary Examiner*—Dennis H. Pedder
*Attorney, Agent, or Firm*—Evenson, McKeown, Edwards & Lenahan

[57] ABSTRACT

The application relates to a convertible automobile with a windscreen which is arranged behind a row of seats and which extends vertically upwards and beyond the top of the seats and which extends for the entire interior width of the vehicle. In order to develop a windscreen of this type in such a way that annoying draft phenomena are prevented while the typical "convertible feel" is maintained, the windscreen is formed by a stretched elastically deformable net which causes a deceleration of the air flow impinging from the rear of the vehicle towards the front.

1 Claim, 4 Drawing Sheets

WINDSCREEN FOR A CONVERTIBLE AUTOMOBILE

This is a continuation of application Ser. No. 07/270,692, filed Nov. 14, 1988 now U.S. Pat. No. 5,219,201.

BACKGROUND AND SUMMARY OF THE INVENTION

The invention relates to a convertible automobile with a windscreen which is arranged behind a row of seats and extends upwards over and beyond this row of seats and which spans the entire interior width of the vehicle.

A windscreen of this general type for a convertible automobile is known from German Utility Model 8,617,748 which uses a transparent pane and which, because of its impermeability to air, affords only moderate wind protection.

U.S. Pat. No. 3,749,147 shows the proposal to stretch a close-mesh fly screen outside the normal and lowerable windows of a vehicle to keep insects, dust, etc., away from the vehicle interior and at the same time prevent excessive heating of the vehicle interior under intensive solar radiation.

The object on which the present invention is based was to develop a windscreen of a generic type in such a way that annoying draft phenomena are prevented while maintaining the typical "convertible feel".

According to the present invention, this object is achieved in that a windscreen is formed by a stretched elastically deformable net which causes a deceleration of the air flow impinging on the driver from the rear of the vehicle.

The special effect of the windscreen according to the invention is based on the following conditions.

In the passenger space of a convertible automobile, a pronounced vacuum is generated during motoring and this leads to noisy air vortices which are also experienced as annoying drafts. Even the known windscreen according to German Utility Model 8,617,748 can change these conditions only slightly. In contrast, by a windscreen according to the instant invention, the vacuum is filled in a proportioned manner, so that there is virtually no noise nuisance and the remaining draft is experienced only as a slight breeze.

A further advantage is obtained if the windscreen is arranged upright or inclined slightly forwards; if the windscreen has a frame carrying the net; if the net design allows for a view to the rear of the automobile; if the windscreen consists of several parts which have a hinge connection therebetween; if a plurality of windscreens are arranged in succession as walls at a distance from one another in the longitudinal direction of the vehicle; if the windscreen can be swung down rearwards into a position of rest at least over some of its height; if the windscreen extends vertically downwards as far as the vehicle floor; if the windscreen is formed of two net parts with an upright part terminating with its lower edge approximately level with the rim edge of a side of the automobile and merges thereat into an approximately horizontal part closing off as openings behind the seats; if the windscreen has a rigid or collapsible roll bar frame providing a lateral seal relative to the side pane; if the windscreen is designed as a window blind arranged inside the roll bar to be withdrawn therefrom; and wherein under a tensile load of 10 N, the net has an extension of between 4% and 40%.

Other objects, advantages and novel features of the present invention will become apparent from the following detailed description of the invention when considered in conjunction with the accompanying drawings.

DETAILED DESCRIPTION OF THE DRAWINGS

Figure 1:
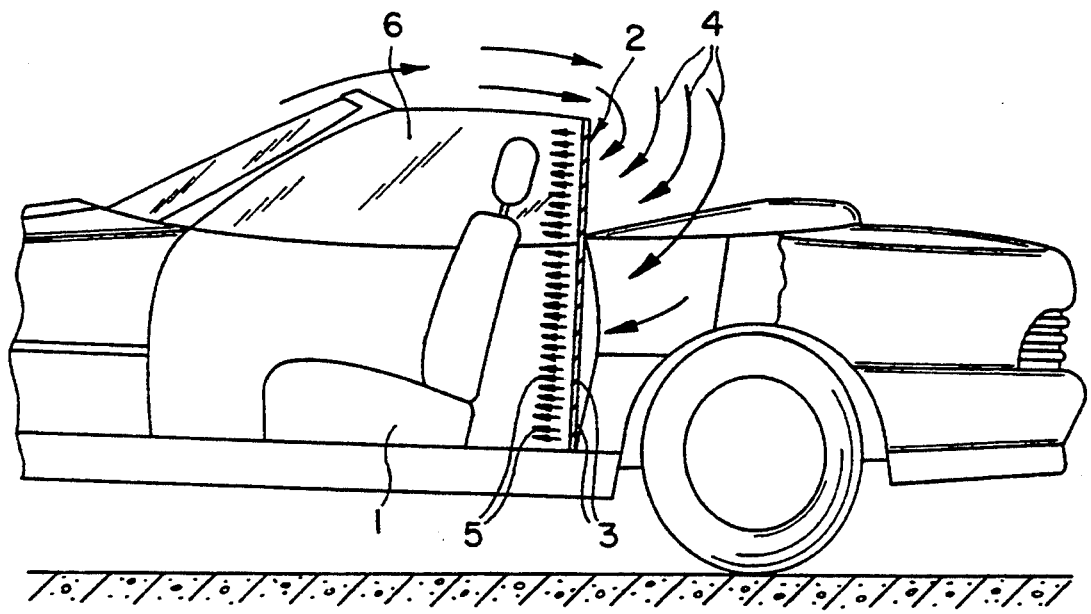
FIG. 1 shows a convertible vehicle with a windscreen shown highly diagrammatically and arranged upright behind the vehicle seats.

FIG. 1 shows an upright windscreen 2 having a plurality of passage holes 3, and arranged behind the seats 1 of a convertible automobile by which the strong air flow arriving in the direction of the arrows 4 is braked sharply, as indicated by the small parallel arrows 5. This braked flow will not have a disturbing effect on the vehicle users as compared to convertible automobile without the windscreen 2.

The windscreen 2 terminates at its top level with the top edge of the fully extended front side window panes 6, and at the bottom it reaches as far as the vehicle floor.

For the sake of greater clarity, a greatly simplified representation of the windscreen is shown which does not take account of the fact that the windscreen 2 consists of a net which is held in a frame and which, when subjected to appropriate pressure, sags or bulges elastically from the rear of the vehicle forwardly.

Figure 1A:
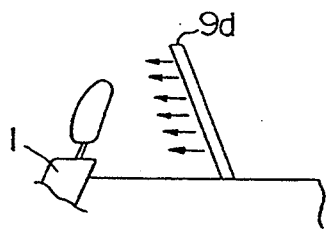
FIG. 1a is a partial side view of the embodiment of FIG. 1 but with the screen inclined slightly forwardly of the vehicle.
Figure 1B:
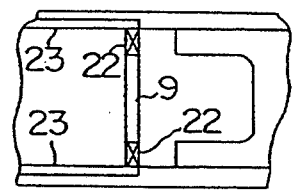
FIG. 1b is a partial top view of the embodiment of FIG. 1 showing a sealing mechanism between the side window panes and the screen.
Figure 7A:
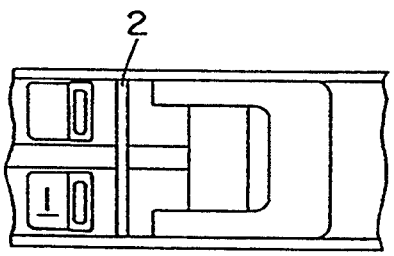
FIGS. 7a and 7b are partial plan views of the windscreens shown in FIGS. 1 and 3, respectively.
Figure 7B:
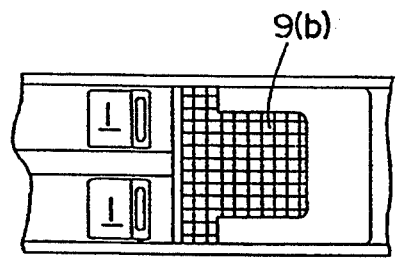

FIG. 1(a) shows a modification where the upper portion 9d of the screen is angularly disposed to lean forward at its top with respect to the driving direction of the vehicle;

FIG. 1(b) shows a sealing arrangement between the vehicle window panes and the screen; and FIG. 1(b) shows that the sides of the frame 9 holding the screen have seals 22 which abut against windows 23 of the vehicle.

Figure 2:
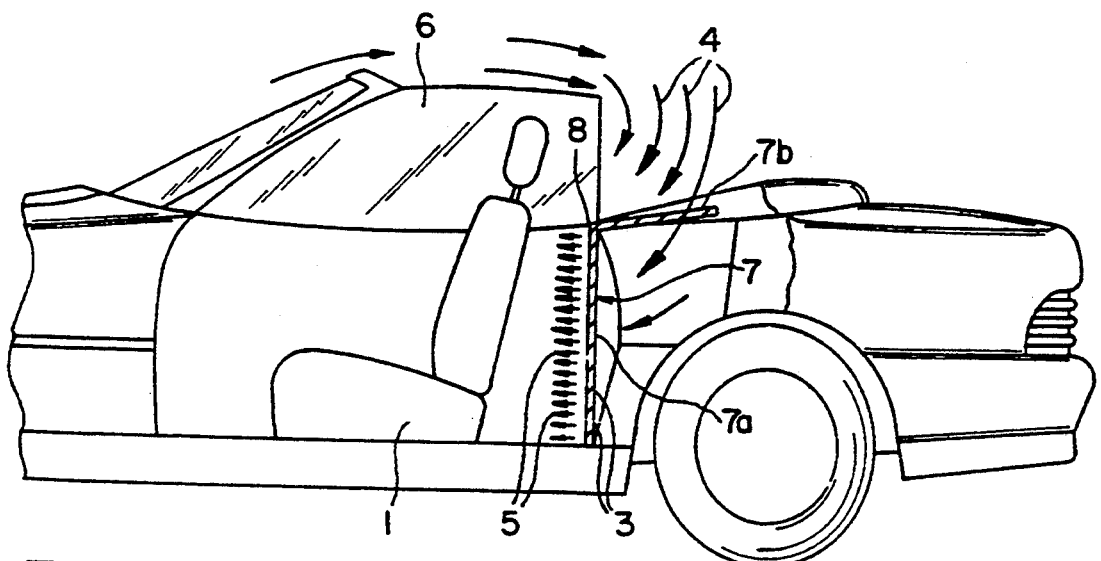
FIG. 2 shows an embodiment similar to that of FIG. 1, but wherein the upper region of the windscreen can be swung down rearwards.

In the embodiment according to FIG. 2, there is a windscreen 7 which consists of a stationary lower part 7a and an upper part 7b which can be swung down rearwards into a position of rest. The two parts 7a, 7b are connected via a hinge 8.

Figure 3:
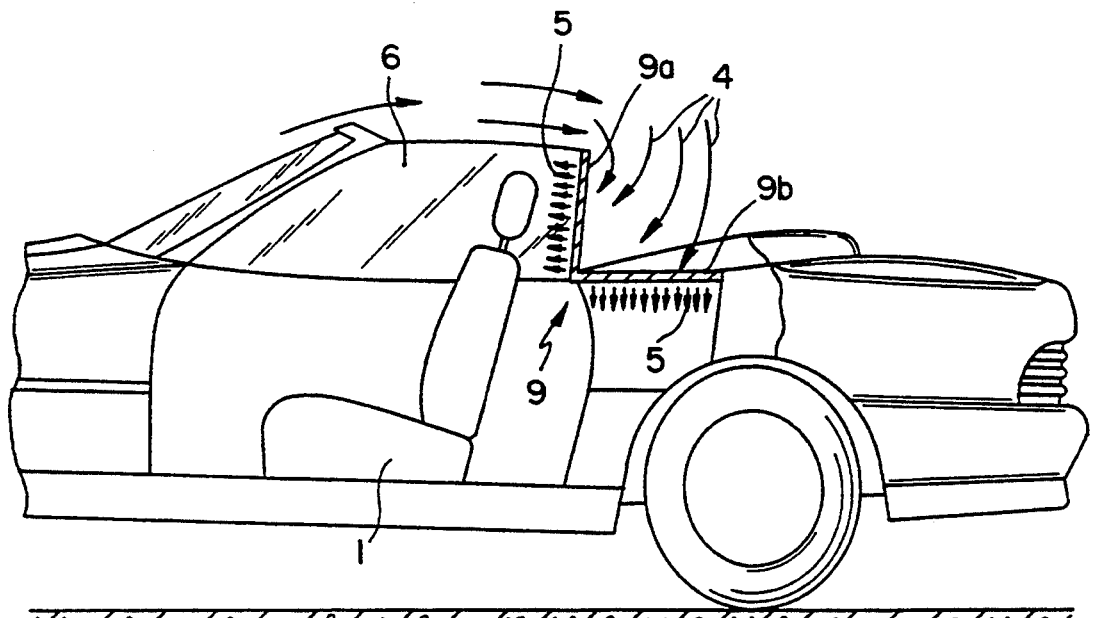
FIG. 3 shows an embodiment with a windscreen consisting of an upper part arranged vertically upright and a lower approximately horizontal part, adjoining the upper part at its bottom.

The embodiment according to FIG. 3 has a two-part windscreen 9'. The Upper part 9a is arranged vertically upright and above the rim edge of the vehicle side and the lower part 9b is arranged approximately horizontally and level with the rim edge of the vehicle side.

Figure 4:
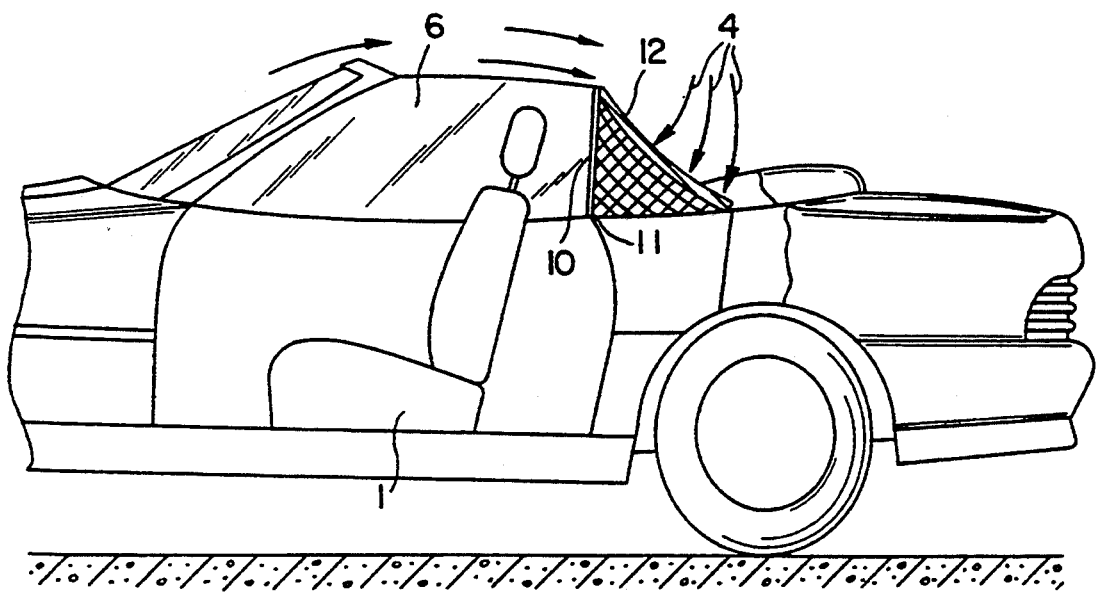
FIG. 4 shows a further embodiment wherein a net-like windscreen is stretched on a frame about the side windows of the vehicle and extending at an angle toward the rear of the vehicle.

FIG. 4 of the drawing shows a further embodiment of the invention. Here there is a frame 10 which projects vertically upwards above the rim edge of the side of the vehicle, and which is articulated tiltably on the vehicle via a hinge 11. Here too, the actual windscreen is formed by a net 12 which is stretched on a frame and which is fastened in a preferably releasable manner at its lower edge to the vehicle body, level with the rim edge of the vehicle. The frame 10 provides a lateral seal relative to the closed side windows 6.

Figure 5:
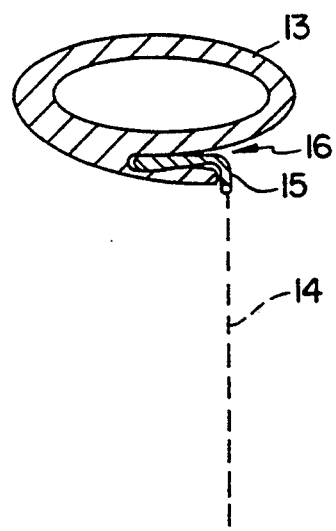
FIG. 5 shows a sectional view through an oval frame of a windscreen.

In order to prevent disturbing whistling noises during motoring, the frame 13 can be designed as an extruded section of oval cross-section, as shown in FIG. 5 of the drawing. In order to fasten the net 14 to the frame 13, the net can be connected in its edge regions to a piping 15 which has sawtooth-shaped projections which can be pushed into a pocket 16 of the frame 13 and retained there.

Figure 8:
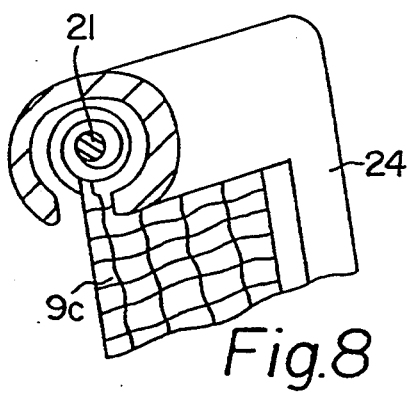
FIG. 8 shows a screen in the form of a roll bar and coiled as a window shade.

FIG. 8 shows the screen in the form of a rolled up window shade 9c about roll bar shaft 21, which is inserted with its coiled screen in a roll bar frame assembly 24.

Figure 9:
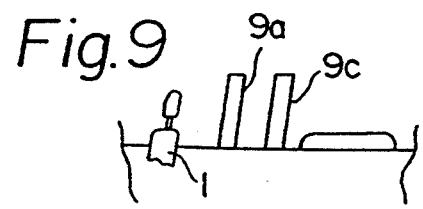
FIG. 9 shows plural windscreens spaced along the vehicle length.
Figure 10:
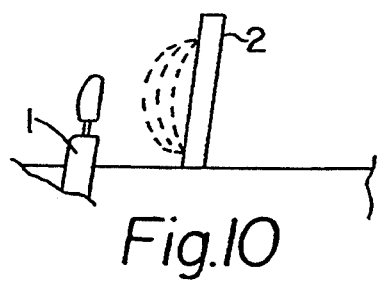
FIG. 10 shows a screen in various degrees of deflection.

FIG. 9 shows a vehicle with two upper screens 9a and 9c, displaced longitudinally of the vehicle.

Figure 6:
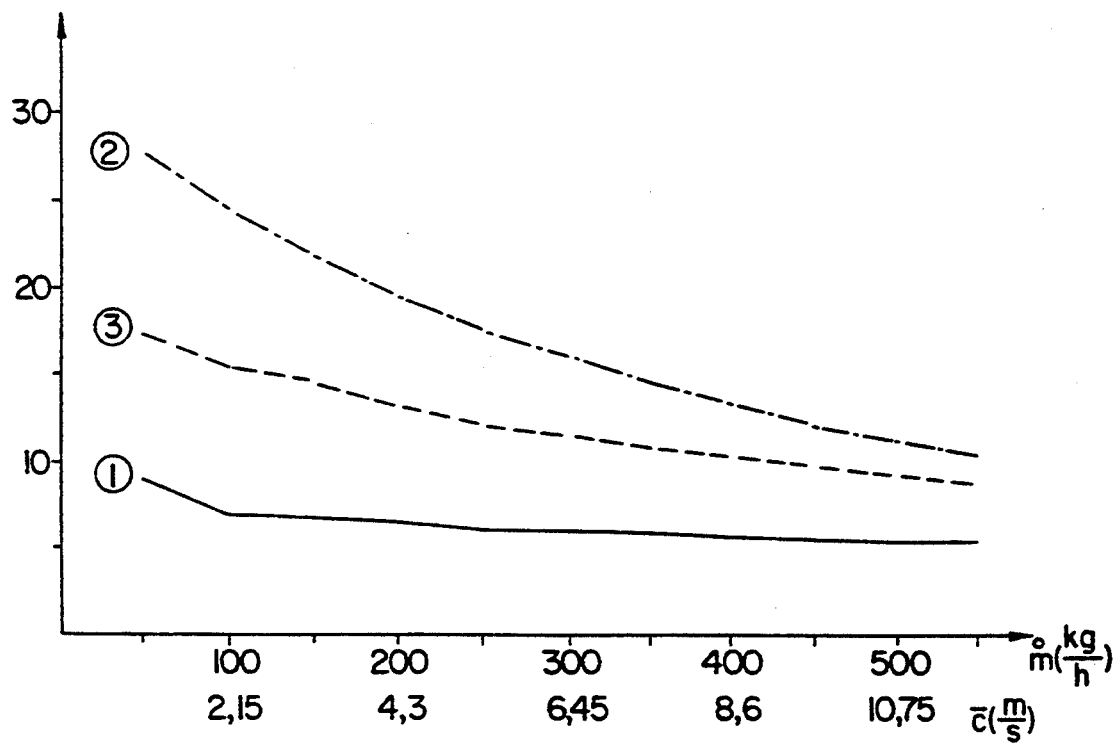
FIG. 6 shows a graph of the flow conditions in nets of differing extensibility.

Finally, FIG. 6 of the drawings shows in graph form, test results with nets of differing elasticity. Curve 1 relates to a polyamide net, curve 2 to a net made of a material marketed under the name "Elastan", and curve 3 likewise to a net made of "Elastan", but pre-stretched by 20%.

In this graph
$\zeta$—Resistance coefficient
SL—Air density
V—Air velocity
$\Delta_p$—Pressure difference in front of and behind the net
—Mass flow in kg per hour
C—Mean air velocity in meters per second The use of nets having a resistance coefficient in the range between the curves 1 and 2 is especially advantageous.

It can be seen clearly from the graphs that the resistance decreases with an increasing flow velocity, this being attributable to, among other things, the elastic extension of the net.

It is possible to vary the elasticity both by virtue of the material used and as a result of the type of weave.

In conclusion, the following may also be stated.

The windscreen has a controlled air permeability which is to be coordinated with the geometrical conditions of the particular vehicle or with the arrangement of the windscreen, in order to ensure the greatest possible freedom from drafts. A controlled air permeability is achieved by the use of different net or fabric materials of differing mesh width (for example, the side length of the mesh is approximately 0.5 mm).

The windscreen is designed so that as a result of its inherent elasticity, it is capable of making the air flow impinging from the rear to the front of the vehicle uniform and of low turbulence to such an extent that the air velocity is reduced and that a lower flow-noise level without disturbing pulsations are experienced in the vehicle interior.

In particular, the elasticity of the wall ensures that when a concentration of turbulence impinges on it, the wall extends and the air permeability increases automatically thereby.

As a result of this variable air permeability which ensures that with an increasing vehicle speed the vacuum increasing in the interior can also be filled by a larger air stream, a uniform freedom from drafts over the entire speed range of the vehicle is possible.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An air-permeable windscreen for an automobile arranged transversely to a longitudinal direction of the automobile and rearwardly of a solid windshield located at a forward end of a passenger space of the automobile, said air-permeable windscreen having at least a portion thereof projecting above an upper edge of rearwardmost seats in the passenger space so as to be impinged by air flow moving over the solid windshield and rearwardly of the air-permeable windscreen and then forwardly toward the air-permeable windscreen, wherein the air-permeable windscreen comprises a stretched, elastically deformable net clamped in a surrounding frame and having an elasticity sufficient to cause elastic deformation of the net from the air flow impinging the air-permeable windscreen from the rear to the front of the automobile in the longitudinal direction during forward driving of the automobile and thereby decelerate the air in a uniform manner over an entire width of the passenger space, said net having a resistance coefficient range defined as a quotient of a function of the difference in air pressure across the net and air density times air velocity squared such that the resistant coefficient drops in value in the range as a function of increasing mass flow of air from the rear to the front of the automobile, and said portion of the windscreen being hinged relative to a remaining portion of the windscreen about an axis transverse to the longitudinal direction of the automobile so as to be movable to a horizontal position.

* * * * *